United States Patent [19]

Nihei et al.

[11] Patent Number: 4,857,786
[45] Date of Patent: Aug. 15, 1989

[54] STRUCTURE OF STEPPING MOTOR AND METHOD OF DRIVING THE STEPPING MOTOR

[75] Inventors: Hideki Nihei; Kunio Miyashita, both of Hitachi; Kouichi Saitoh, Kitaibaraki; Seizi Yamashita, Katsuta, all of Japan

[73] Assignee: Hitachi, Ltd., Tokyo, Japan

[21] Appl. No.: 178,213

[22] Filed: Apr. 6, 1988

[30] Foreign Application Priority Data

Apr. 6, 1987 [JP] Japan ............................ 62-82914
Apr. 13, 1987 [JP] Japan ............................ 62-88818
May 25, 1987 [JP] Japan ............................ 62-125893

[51] Int. Cl.$^4$ .................. H02K 21/12; H02K 1/02
[52] U.S. Cl. ........................... 310/156; 310/43; 310/44; 310/49 R; 335/302
[58] Field of Search ................. 335/302, 303, 306; 310/43, 44, 49 R, 156, 12

[56] References Cited

U.S. PATENT DOCUMENTS 4,725,750  2/1988  Welch ................................ 310/156
4,728,830  3/1988  Gamble ............................. 310/12

FOREIGN PATENT DOCUMENTS 2847203  5/1979  Fed. Rep. of Germany ...... 310/156
0003292  1/1979  Japan ..................................... 310/44

OTHER PUBLICATIONS

Laithwaite, E. R., Linear-Motion Electrical Machines, Apr. 1970, Proceedings of the IEEE, vol. 58, No. 4, p. 531.

Primary Examiner—Patrick R. Salce
Assistant Examiner—Judson H. Jones
Attorney, Agent, or Firm—Antonelli, Terry & Wands

[57] ABSTRACT

The present invention provides a large-thrust stepping motor improved in thrust constant by provision of slots at equal intervals between adjacent N and S poles of a permanent magnet disposed on a movable member of the motor or by division of the winding for each phase of a stator of the motor into two or more sections to pass currents independently through the divisional sections in accordance with the speed of the motor.

Further, the invention provides a large-thrust stepping motor using a field magnet having large magnetomotive force, the field magnet being formed by combination of a magnet substrate and permanent magnets independent from the magnet substrate.

10 Claims, 11 Drawing Sheets

STRUCTURE OF STEPPING MOTOR AND METHOD OF DRIVING THE STEPPING MOTOR

BACKGROUND OF THE INVENTION

1. Field of the Invention

The present invention relates to a structure of a stepping motor and a method of driving the stepping motor, and particularly, relates to a field magnet used in the motor of this type.

2. Description of the Prior Art

Conventional stepping motors of the hybrid type are superior in thrust to the motors of the other types under equal conditions in electric source capacity and motor rating. However, those hybrid stepping motors have a disadvantage in that it is difficult to perform high-speed driving because of the influence of inductance. The disadvantage is described in detail with reference to FIG. 2 which shows a first conventional technique to be improved.

Consideration will be made about the inductance of hybrid stepping motors. In regard to windings 3 and 4, the magnetic circuit of FIG. 2 has a magnetic path in the direction of the arrow. The magnetic reluctance of the circuit is determined mainly by the shape of gaps. The magnetic reluctance $R_c$ as to the windings 3 and 4 is represented by the equation: $R_c = R_{g1} + R_{g2}$, in which $R_{g1}$ and $R_{g2}$ respectively represent the magnetic reluctance in the gaps of poles A and $\overline{A}$ of a stator 1. The inductance of the windings is in proportion to the square of the number of turns N and in reverse proportion to the magnetic reluctance, as represented by the equation:

$$L = K \cdot \frac{N^2}{R_c} \; (H)$$

in which K is a constant.

For driving the hybrid motor at a high speed, it is necessary to make a current for the windings rise rapidly so as to generate large thrust in a short time. Accordingly, the electrical time constant represented by the ratio of inductance to resistance of the windings has a serious meaning.

The electrical time constant of the conventional hybrid stepping motor is of the order of several mS, and various methods have been heretofore used for driving the motor at a high speed with respect to the electrical time constant. In the following, the conventional methods are described in brief.

One of the methods is such that a resistor is connected in series at the outside to increase the value of resistance to thereby minimize the time constant. However, the method has a problem in that the increase of the consumption of electric power by the resistor causes troubles, such as the lowering of efficiency in the stepping motor, the overheat of the motor, and the like.

Another one of the methods is such that the number of turns of the windings is decreased or the gaps are enlarged to increase the magnetic reluctance to thereby reduce the inductance. However, the method has a problem in that the thrust constant of the motor represented by a ratio f/I of the thrust f (newton) to the motor current I (Ampere) is adversely affected and becomes lower under the condition of the same electric source capacity.

As a means for increasing the magnetic reluctance without deterioration of thrust, a method in which a magnet is provided in the magnetic circuit as to the windings, that is, in which a magnet is provided in the magnetic path of the arrow of FIG. 2, is considered. However, in the case where the magnet is merely provided in the path of the arrow, the change of flux interlinkage with the windings according to the change of magnetic reluctance of the gaps is reduced to lower the thrust constant, though the magnetic reluctance is increased corresponding to the magnetic reluctance of the magnet. Accordingly, the reduction in thrust can not be avoided even in this method.

To solve the aforementioned problems, a motor having the structure of FIG. 3 has been considered. The structure is such that in order to reduce the inductance, permanent magnets 13 and 14 to be provided in the series magnetic circuit of the windings are mounted on the surfaces of poles, and in order to enlarge the change of flux interlinkage with the windings 3, 4, 5 and 6, the polarity of poles of the magnets is inverted corresponding to the pitch of the teeth of the poles, so that the reduction of thrust is prevented. In the structure, however, a magnetic leakage path is formed between adjacent poles of the permanent magnets to reduce effective flux in the gaps, so that the flux interlinkage with the windings is reduced. Accordingly, sufficient thrust cannot be attained even by this structure. In order to reduce the flux leakage, the permanent magnets must be thinned sufficiently relative to the pitch of the poles of the permanent magnets. However, the magnetic reluctance of the magnets decreases as the thickness thereof decreases. Accordingly, a problem arises in that the inductance of the windings increases. Further, in the case where the pitch of the poles of the permanent magnets are enlarged, the pitch of the teeth must be enlarged with the enlargement of the pitch of the poles of the permanent magnets. Accordingly, a problem arises in that the thrust constant is lowered because the change of flux relative to the positional change of the movable member is reduced.

Consequently, even in the case where the polarity of poles of the magnets are inverted corresponding to the pitch of the teeth in order to enlarge the change of flux, it has been difficult to make the reduction of inductance compatible with the improvement of thrust constant.

An example of the conventional stepping motor in which resistance is increased to thereby improve response is disclosed in Takashi Kenjo and et al., "Principle and Application of Stepping Motor", Sogo Electronics Publishing Co., Ltd., pages 180 to 182, February 1979, an example of the conventional stepping motor in which a magnet is provided in the magnetic circuit of the windings is disclosed in Japanese Patent Unexamined Publication JP-A-60-200757, and an example of the conventional stepping motor in which the polarity of poles of a permanent magnet is inverted at a pitch equal to the pitch of teeth is disclosed in Osahiko Nagasaka, "Study of Prototype PM Linear Pulse Motor", Magnetics Research of the Institute of Electrical Engineers of Japan, MAG-85-130, 1985.

Consequently, the aforementioned first conventional technique has the problem that the thrust constant is lowered with the attempt to reduce the electrical time constant, because the technique is not under sufficient consideration as to the relation between the thrust constant and the electrical time constant in the hybrid stepping actuator.

In the following, a motor driving method according to a second conventional technique will be described with reference to FIGS. 10A and 10B. In the drawings, the reference numeral 101 designates a section of a motor, and the reference numeral 102 designates a circuit for driving the motor. The motor has a pair of stators 103, and a movable member 108. The stators 103 are provided with A-phase and B-phase windings 104 and 106, respectively. The movable member 108 is provided with permanent magnets 109 disposed at the opposite sides thereof. Each of the permanent magnets 109 has a plurality of poles disposed at equal intervals at the pitch equal to the pitch λ of the teeth of the stators 103 so that the poles N and S of each of the permanent magnets 109 alternate. The permanent magnets 109 are disposed in a manner so that one permanent magnet 109 being in opposition to the A-phase stator is shifted in phase by an electric angle of 90 degrees (¼ of the teeth pitch λ) relative to the other permanent magnet 109 being in opposition to the B-phase stator. The drive circuit 102 is provided with two groups of transistors 110, 111, 120 and 121, and 112, 113, 122 and 123. The one group of transistors 110, 111, 120 and 121 are connected to each other in the form of H through the A-phase winding 104, while the other group of transistors 112, 113, 122 and 123 are connected to each other in the form of H through the B-phase winding 106, the one and the other transistor group being connected across a DC source 131, as shown in FIG. 10B. The transistors are ON-OFF controlled by a control circuit 130 which is supplied with a signal from a sensor circuit 132 for sensing the position of the movable member 108.

In the motor, the direction of flux interlinked with the windings 104 and 106 is inverted in accordance with the position of the movable member 108 so that the direction of a current flowing in the windings 104 and 106 is inverted corresponding to the change of flux to thereby generate thrust in the movable member. The changes of flux interlinkage with the respective windings 104 and 106 are shifted in phase by 90 degrees from each other corresponding to the shifting of the position of the permanent magnets 108 and 109. Accordingly, if the currents of the A-phase windings 104 and B-phase windings 106 are inverted in accordance with the respective phases of the currents, unidirectional thrust can be generated in the movable member continuously at any position thereof. The groups of H-connected transistors in the driving circuit 102 are driven to operate in a manner as follows. That is, in the one group of H-connected transistors associated with the A-phase winding 104, the transistors 110 and 121 are turn on at a certain point of time to pass a current from the terminal a to the terminal b, whereafter the transistors 111 and 120 are turn on at the next point of time to pass a current from the terminal b to the terminal a reversely. Also the other group of H-connected transistors associated with the B-phase winding 106 are driven to operate in the same manner as the above-mentioned one group of transistors. The aforementioned reversible operation of current flowing in the windings 104 and 106 can be accomplished by the foregoing ON-OFF operation of the transistors. The transistors are controlled by control signals from the control circuit 130. The control circuit 130 receives the position signal from the sensor circuit 132 for sensing the position of the movable member 108 so as to judge whether the current is to be inverted or not to thereby control the current. Alternatively, the control circuit 130 may judge the inversion of the current by itself to thereby control the current by so-called open-loop control without using the position signal.

The motor of this type has an advantage in that only thrust can be enlarged by minimizing the pitch of the teeth with the motor rating kept fixed, because the magnitude of thrust is in proportion to the change of flux interlinkage with the windings. Accordingly, a load can be moved at a high speed by use of such a motor driving method. Accordingly, the motor of this type can be suitably used as an actuator for feeding a head in a disk drive or the like.

An example of the motor of this type is disclosed in Japanese Patent Unexamined Publication JP-A-56-74080.

The aforementioned second conventional technique has an advantage in that large thrust driving in a motor can be attained, but has a problem in that the current flowing in the windings is reduced with the increase of reactance and with the rising of the induced voltage when the motor becomes into a high-speed running condition, because the technique is not under sufficient consideration as to the maintenance of the large thrust in the high-speed condition.

In the following, a field magnet used in stepping motors and linear pulse motors according to a third conventional technique, will be described.

Generally, a linear pulse motor using a field magnet is formed as described in Japanese Patent Unexamined Publication JP-A-56-74080. According to the above Japanese Patent Unexamined Publication, a stator is constituted by an elongated base and a plurality of permanent magnets fixed to the upper surface of the base. The permanent magnets are magnetized to provide N and S poles alternately in a direction of movement of an armature along the stator.

As described above, since the poles of the field magnet in the conventional motor are formed by magnetization at a fine pitch, so that large magnetomotive force cannot be generated.

Accordingly, the thrust of the conventional motor is too small to deal with a large load. This causes limitation in the purposes of use of the motors or actuators of this type.

SUMMARY OF THE INVENTION

An object of a first aspect of the present invention to solve the problem in the first conventional technique is to provide a hybrid stepping motor in which the electrical time constant is reduced without lowering the thrust constant by optimizing the position and form of permanent magnets used in the motor.

The foregoing object of the invention is attained by a structure of the stepping motor in which each permanent magnet is provided to face the gap of a stator or a movable member, the polarity of poles of the permanent magnet is inverted at a pitch equal to that of the teeth of the movable member or the stator facing the permanent magnet, and slots are provided in the permanent magnet at positions where the polarity of poles of the permanent magnet is changed over.

In the aforementioned structure in which the polarity of poles of the permanent magnet is inverted at a pitch equal to that of the teeth of the movable member or the stator facing the permanent magnet, the following operations are attained. In a first condition in which the phase of the permanent magnet is made coincident with that of the teeth, the flux of the poles of the permanent magnet at the short gap length side (at the low gap magnetic reluctance side) is interlinked with the windings. In a second condition in which the phase of the permanent magnet is shifted by half a pitch relative to that of the teeth, the gap magnetic reluctance is equal to the poles different in polarity of the permanent magnet so that the flux is terminated between the poles different in polarity of the permanent magnet and is not interlinked with the windings. In a third condition in which the gap length for the poles of the permanent magnet is reversed to the first condition, the flux in the reverse direction to the first condition is interlinked with the windings. As described above, the flux interlinkage with the windings which is zero in the first condition widely changes corresponding to the relative positional change of the permanent magnet on the basis of the condition where the flux interlinkage with the windings is zero. For example, the condition of flux interlinkage with the windings changes from the first condition to the first condition again through the second condition, the third condition, and the second condition again. That is, the flux interlinkage with the windings changes widely between positive and negative on the basis of zero, successively. Accordingly, the thrust of the motor becomes very large.

Further, the inductance of the windings is reduced by arranging the permanent magnet in series to the magnetic circuit of the windings so that the electrical time constant of the motor can be reduced.

Further, consideration should be made on the point that slots are provided at the positions where the polarity of poles of the permanent magnet is changed over. That is, the slots are provided so that the plurality poles of the permanent magnet are shaped in the form of teeth to thereby reduce flux leakage between adjacent poles different in polarity of the permanent magnet so as to increase flux in the gap. If such slots are not provided, magnetic reluctance at the polarity changeover positions is so small that flux concentrates at those positions so as to greatly increase flux leakage to thereby reduce flux interlinkage with the windings. Otherwise, if those slots are provided, the flux of the permanent magnet itself decreases with the decrease of the area of the permanent magnet but the magnetic reluctance between adjacent poles of the permanent magnet increases due to the slots between adjacent poles different in polarity, so that magnetic leakage is greatly reduced. Consequently, the provision of those slots brings the increase of flux interlinkage with the windings and the increase of thrust. Instead of provision of those slots, a plurality of magnets may be provided at equal intervals so that poles different in polarity are arranged alternately. Also in this case, the same effect can be attained. In addition, the gaps or slots may be filled with a non-magnetic material.

In the aforementioned second conventional technique, a current I which can be made to flow in the one-phase windings of the actuator with an electric source voltage $E_s$ is expressed by the equation:

$$I = \frac{E_s - k_e \cdot v}{\sqrt{r^2 + \left(2\pi \frac{v}{p} L\right)^2}} \quad (1)$$

where r represents the resistance, L represents the inductance, v represents the velocity, p represents the pitch, and $k_e$ represents the induced voltage constant. In the equation (1), the reactance X is expressed by the following equation:

$$X = 2\pi \frac{v}{p} L$$

Accordingly, the thrust f generated in the one phase is expressed by the equation:

$$f = k_f \cdot I = \frac{k_f(E_s - k_e \cdot v)}{\sqrt{r^2 + \left(2\pi \frac{v}{p} L\right)^2}} \quad (2)$$

where $k_f$ represents the thrust constant.

On the basis of the equations, the current in the windings decreases and the generated thrust decreases as the speed increases.

FIG. 11 shows a velocity-thrust graph of the motor. In the drawing the broken line shows characteristics due to a term in the numerator of the equation (2). The thrust linearly decreases as the induced voltage $k_e \cdot v$ increases. Further, the solid line shows characteristics due to the term of reactance $2\pi(v/p) L$ in the denominators of the equation (2). The degree of decrease of the thrust is more intensive in the low-speed area as shown by the solid line.

Accordingly, in spite of the fact the motor has a large thrust constant, the current in the windings is reduced in the high-speed operation so that sufficient acceleration cannot be attained.

Further, as described above, the conventional motor having the structure that poles are shaped in the form of teeth has the advantage in that the thrust (thrust constant) can be enlarged by minimizing the pitch of the teeth. However, as the pitch of the teeth decreases, angular frequency $2\pi(v/p)$ of reactance increases in spite of the same speed. Accordingly, the effect of large thrust cannot be expected in the high-speed operation.

An object of a second aspect of the present invention to solve the problem in the second conventional technique is to provide a method of driving a motor which can prevent the lowering of the generated thrust with the lowering of the current flowing in the windings in the aforementioned high-speed operation.

The foregoing object of the second aspect of the invention is attained by the driving method in which a control means is provided for dividing the windings for each phase of the motor into two or more sections to thereby change the number of turns of windings into which a current is made to flow, and in which the speed of the motor is detected so that the number of turns of the windings into which a current is made to flow is changed in accordance with the motor speed.

In the following, the operation based on the aforementioned arrangement is described.

In the motor, the windings for each phase is divided into two or more sections, and a drive circuit is provided to pass currents through the divisional winding sections independently. Further, means for detecting the speed of the motor is provided so that the number of turns of the windings through which a current is made to flow can be changed by the control circuit in accordance with the speed of the motor. Accordingly, the number turns of the windings into which a current is made to flow is increased in the low-speed operation, so that high acceleration can be attained by the increase of the thrust constant, while the number turns of the windings into which a current is made to flow is reduced in the high-speed operation, so that the decrease of current can be prevented to maintain necessary thrust. Thus, it is possible to realize an actuator which can maintain necessary thrust in a necessary range of speed and can operate at a high speed.

An object of a third aspect of the present invention to solve the problem in the third conventional technique is to provide a field magnet which is suitably applied to a stepping motor so that large thrust can be attained. Another object of the third aspect of the invention is to provide a field magnet which is so simple in construction that workability in manufacturing can be improved greatly.

The foregoing objects of the third aspect of the invention is attained by a field magnet comprising a magnet substrate having magnet holding through holes or slots disposed at equal intervals of a predetermined pitch and magnetized in the direction of thickness, and permanent magnets magnetized in the reverse direction to the magnet substrate and inserted into the magnet holding through holes or slots of the magnet substrate to form the field magnet in combination.

According to the aforementioned construction, a magnet substrate and permanent magnets respectively magnetized in advance are combined with each other. Accordingly, there is no demagnetization due to magnetization, so that the magnetomotive force of the field magnet can be improved.

DESCRIPTION OF THE PREFERRED EMBODIMENTS

Figure 1:
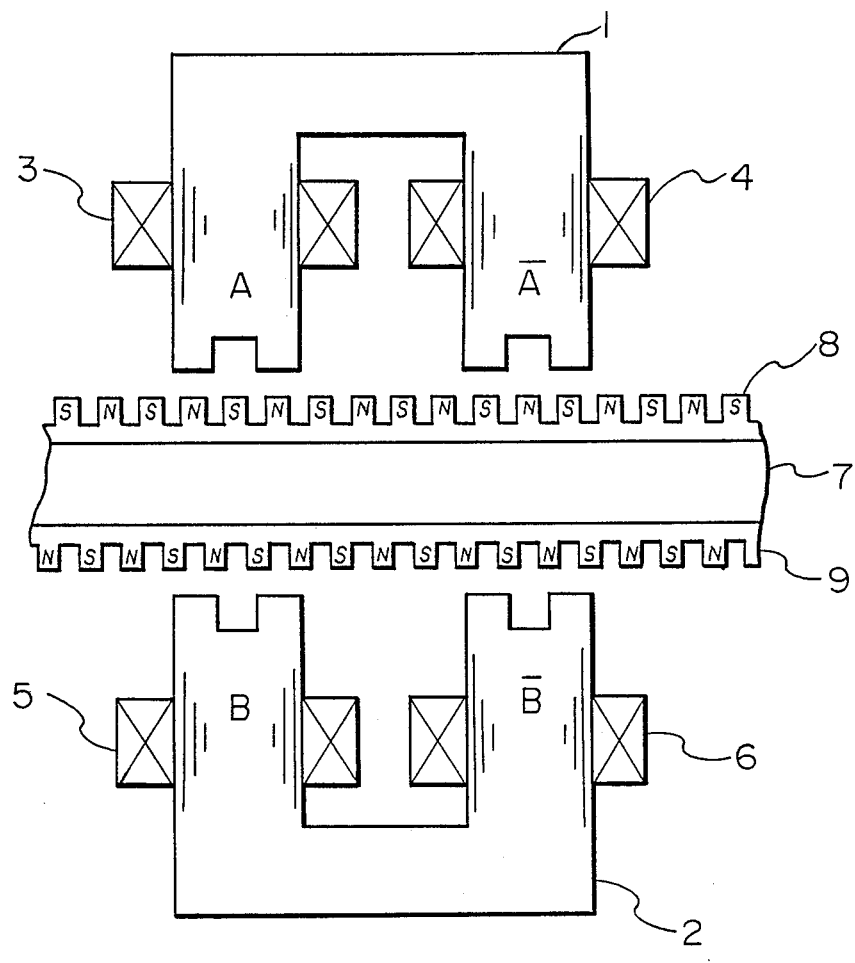
FIG. 1 is a sectional view showing an embodiment according to the first aspect of the present invention.
Figure 2:
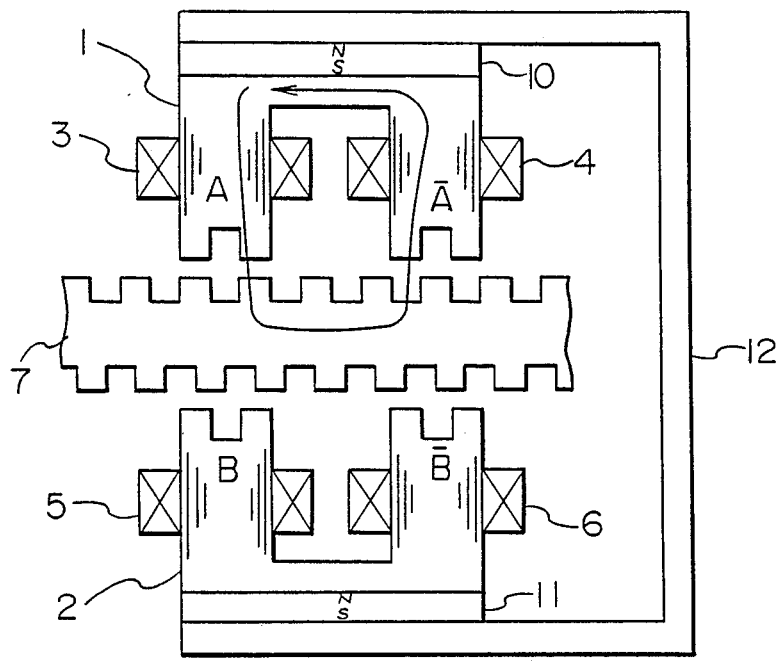
FIGS. 2 and 3 are sectional views of the structure of a first example of the conventional motor.

An embodiment according to the first aspect of the invention will be now described with reference to FIG. 1.

Stators 1 and 2 are provided to face each other with a gap therebetween. A movable member 7 is provided within the gap between the stators 1 and 2 and in parallel to the stators 1 and 2 to form predetermined gaps with respect to the stators 1 and 2. Permanent magnets 8 and 9 are mounted on the respective surfaces of the movable member 7 facing the stators 1 and 2 respectively. Each of the permanent magnets 8 and 9 has a plurality of poles disposed at equal intervals and providing S and N polarities alternately such that a pair of S and N poles appear repeatedly at every distance corresponding to one pitch of the teeth of the stators 1 and 2. The phase of the polarity of the permanent magnet 9 is shifted by 90° (¼ pitch of the poles of the same polarity of the magnet) relative to the phase of the polarity of the permanent magnet 8. The stator 1 has two poles A and $\overline{A}$ and the stator 2 has two poles B and $\overline{B}$. The relation in phase of the polarities of those poles of the stators are set to be as follows. That is, when the one pole A approaches an N pole of the permanent magnet 8, the other pole $\overline{A}$ is located near an S pole of the permanent magnet 8 (or in other words, the phase of the pole A is shifted by 2/4 pitch with respect to the phase of the pole $\overline{A}$ where one pitch is corresponding to a distance between the leading edge of one pole of the permanent magnet and the leading edge of the next pole of the same polarity). Further, in this case, the pole B is located in the middle between an S pole and an adjacent N pole of the permanent magnet 9 (or in other words, the phase of the pole B is shifted by ¾ pitch), and the pole $\overline{B}$ is located in the middle between an N pole and an adjacent S poles of the permanent magnet 9 (or in other words, the phase of the pole $\overline{B}$ is shifted by ¼ pitch).

A winding 3 is provided on the pole A of the stator 1, and a winding 4 is provided on the reverse pole $\overline{A}$ of the same stator 1. A winding 5 is provided on the pole B of the stator 2, and a winding 6 is provided on the reverse pole $\overline{B}$ of the same stator 2.

Figure 4:
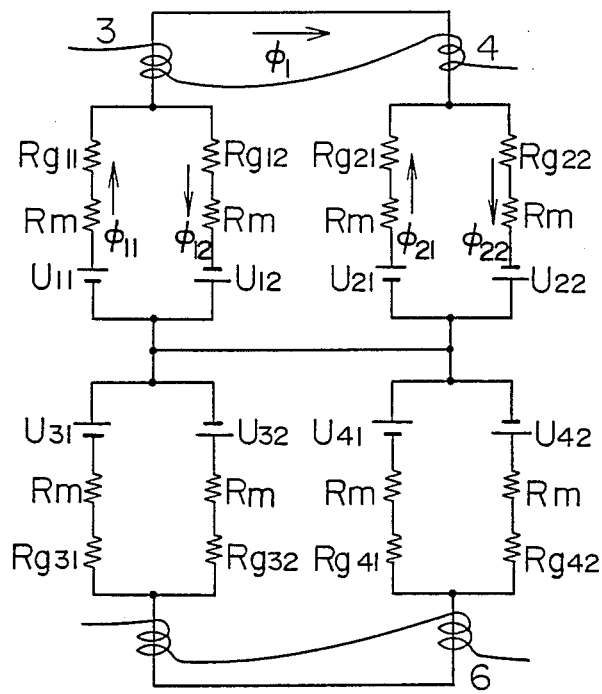
FIG. 4 is a view of an equivalent magnetic circuit of the embodiment according to the first aspect of the invention.

The magnetic circuit of the aforementioned motor is shown in FIG. 4. In FIG. 4, $U_{11}$ represents magnetomotive force produced at the N-pole side of the permanent magnet 8 with respect to the pole A, $U_{12}$ represents magnetomotive force produced at the S-pole side of the same permanent magnet 8 with respect to the pole A, $U_{21}$ represents magnetomotive force produced at the N-pole side of the same permanent magnet 8 with respect to the pole $\overline{A}$, and $U_{22}$ represents magnetomotive force produced at the S-pole side of the same permanent magnet 8 with respect to the pole $\overline{A}$. Similarly to this, $U_{31}$ represents magnetomotive force produced at the N-pole side of the permanent magnet 9 with respect to the pole B, $U_{31}$ represents magnetomotive force produced at the S-pole side of the same permanent magnet 9 with respect to the pole B, $U_{41}$ represents magnetomotive force produced at the N-pole side of the same permanent magnet 9 with respect to the pole $\overline{B}$, and $U_{42}$ represents magnetomotive force produced at the S-pole side of the same permanent magnet 9 with respect to the pole $\overline{B}$. $R_m$ represents magnetic reluctance in each magnet, $R_{g11}$ represents magnetic reluctance in the gap of the pole A which receives flux from the N-pole side of the permanent magnet 8, $R_{g12}$ represents magnetic reluctance in the gap of the pole A which receives flux from the S-pole side of the permanent magnet 8, $R_{g21}$ represents magnetic reluctance in the gap of the pole $\overline{A}$ which receives flux from the N-pole side of the permanent magnet 8, $R_{g22}$ represents magnetic reluctance in the gap of the pole $\overline{A}$ which receives flux from the S-pole side of the permanent magnet 8, $R_{g31}$ represents magnetic reluctance in the gap of the pole B which receives flux from the N-pole side of the permanent magnet 9, $R_{g32}$ represents magnetic reluctance in the gap of the pole B which receives flux from the S-pole side of the permanent magnet 9, $R_{g41}$ represents magnetic reluctance in the gap of the pole $\overline{B}$ which receives flux from the N-pole side of the permanent magnet 9, and $R_{g42}$ represents magnetic reluctance in the gap of the pole $\overline{B}$ which receives flux from the S-pole side of the permanent magnet 9.

The magnetic reluctance in each gap changes sinusoidally with the pitch $\tau$ of the teeth as one period according to the position of the teeth of the movable member 7 relative to the teeth of the stators 1 and 2. When the magnetic reluctance $R_{g11}$ and $R_{g22}$ are minimized, the magnetic reluctance $R_{g12}$ and $R_{g21}$ are maximized. Accordingly, in this case, the flux $\phi_{11}$ and the flux $\phi_{22}$ due to the magnetic reluctance $U_{11}$ and $U_{22}$ are maximized, and the flux $\phi_{12}$ and the flux $\phi_{21}$ due to the magnetic reluctance $U_{12}$ and $U_{21}$ are minimized. Accordingly, the flux interlinkage $\phi_1$ with the windings 3 and 4 passes in the direction of the arrow of FIG. 4. Contrariwise, in the case where the magnetic reluctance $R_{g11}$ and $R_{g22}$ are maximized, the magnetic reluctance $R_{g12}$ and $R_{g21}$ are minimized. Consequently, in this case, the flux interlinkage $\phi_1$ with the windings 3 and 4 passes in the reverse direction to the arrow of FIG. 4. As described above, the changes of flux arise in the windings 3 and 4 according to the position of the movable member 7. If a current flows in the windings, thrust is generated to move the movable member linearly. On the other hand, the changes of magnetic reluctance in the gaps at the lower side of the magnetic circuit of FIG. 4 are relatively shifted by the phase of $\pi/2$ compared with the upper side of the magnetic circuit, so that thrust shifted by $\pi/2$ is generated.

Since the teeth pitch is selected to be a value of the order of millimeters, the change of flux according to the positional change of the movable member is so large that large thrust can be attained.

The magnetic reluctance $R_c$ of the magnetic circuit with respect to the windings 3 and 4 is increased by the magnetic reluctance of the magnet and is expressed by the following equation:

$$R_c = (R_{g11}+R_m)//(R_{g12}+R_m) + (R_{g21}+R_m)//(R_{g22}+R_m)$$

Accordingly, the inductance of the windings 3 and 4 becomes smaller because of the increase of the magnetic reluctance, and the inductance of the windings 5 and 6 becomes also smaller, compared with that of prior art windings.

Further, in this embodiment, slots are provided between adjacent poles different in polarity in each of the permanent magnets to prevent flux leakage from occurring between adjacent poles different in polarity. In other words, each of the permanent magnets has teeth formed respectively at poles, so that a gap is put between adjacent poles different in polarity to thereby elongate the magnetic path to increase the magnetic reluctance thereat. Accordingly, comparing with the magnetic reluctance of the gap between the teeth which face the teeth of the permanent magnet and which contribute to the change of flux interlinkage with the windings, the magnetic reluctance between adjacent poles different in polarity of the permanent magnet increases to thereby reduce the flux leakage between the adjacent poles different in polarity. Accordingly, the permanent magnet having such slots provided between adjacent poles does not reduce the thrust constant, and therefore the permanent magnet can be thickened to reduce the inductance suitably and the inductance can be reduced without reduction of the thrust constant.

Further, the width of each slot of the permanent magnet may be larger than that of the gap between the teeth faced by the slot. In this case, the magnetic reluctance in the leakage path between adjacent poles of the permanent magnet is larger than that of the gap, so that the aforementioned effect can be attained more remarkably.

As described above, this embodiment can provide a linear stepping motor having a large thrust constant and being superior in high speed performance.

Figure 5:
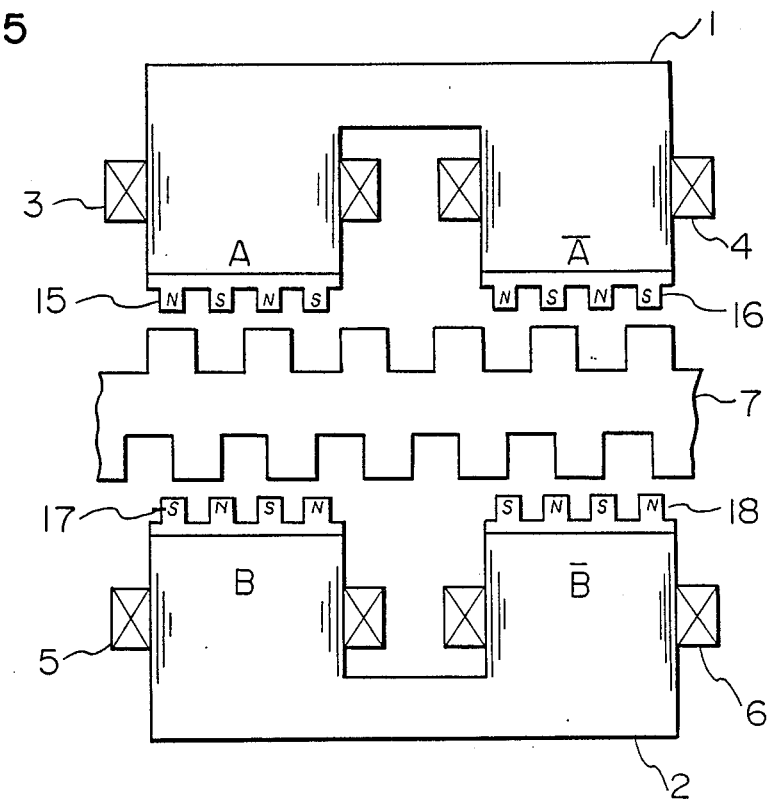
FIG. 5 is a sectional view of another embodiment according to the first aspect of the invention.

A second embodiment according to the first aspect of the invention is shown in FIG. 5. In this embodiment, the aforementioned permanent magnets are provided on the stators 1 and 2. Also in this embodiment, the same effect as described above in the first embodiment, that is, the effect of large thrust and high-speed driving performance can be attained. In addition, this embodiment has another effect in that the permanent magnet can be relatively reduced in size as well as weight compared with the first embodiment, because the length of the permanent magnet is equal to that of the pole of the stator, as measured in a direction of movement of the movable member.

Although this embodiment has shown the case where the invention is applied to a linear motor, it is a matter of course that the invention is applicable to a rotary motor and that a high-speed and large-torque motor can be provided by forming the rotary motor in the same manner as described above.

Figure 6:
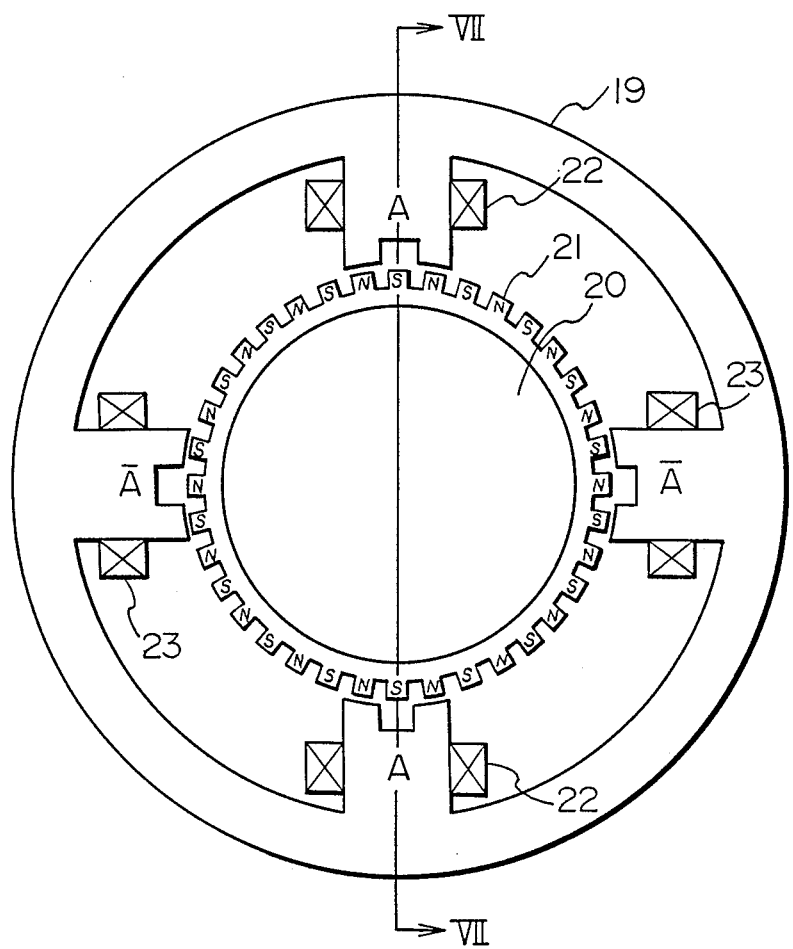
FIG. 6 is a front view of a rotary stepping motor.
Figure 7:
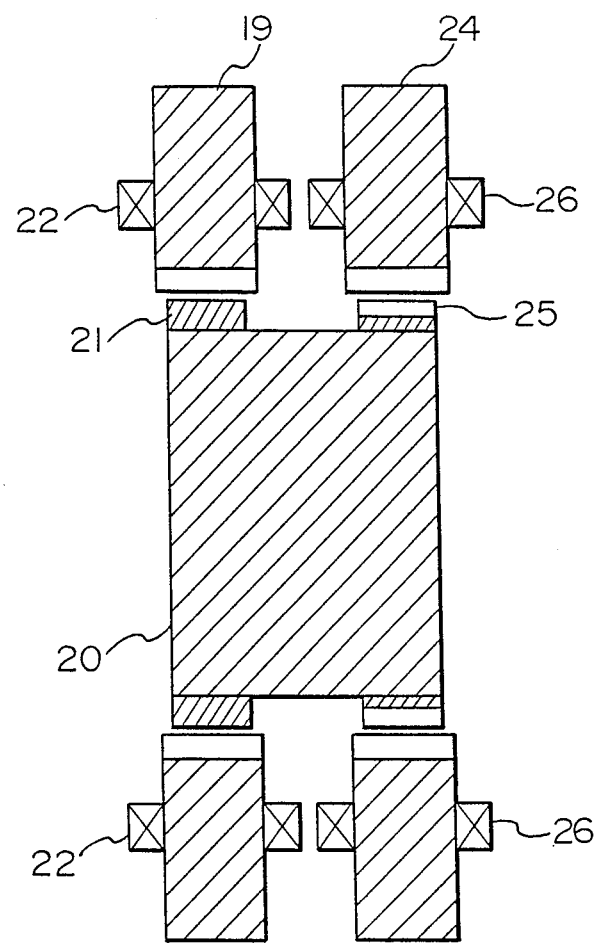
FIG. 7 is a sectional side view of the rotary stepping motor.

FIG. 6 shows a further embodiment in which the invention is applied to a rotary motor. FIG. 7 is a sectional view taken along the line VII—VII of FIG. 6. In this embodiment, a permanent magnet 21 having poles which are reversed in polarity at equal intervals in proportion of $\frac{1}{2}$ of the pitch of the teeth of the stator 19 in the same manner as the linear motor, is mounted onto the outside of a rotor 20. Further, slots are provided at positions where the polarity of poles of the permanent magnet 21 is changed over. As shown in FIG. 7, the phase of the permanent magnet 21 in the A-phase of the rotor 20 is shifted by $\frac{1}{4}$ of the pitch $\tau$ compared with the phase of the permanent magnet 25 in the B-phase thereof. According to this structure, a large-thrust and low-inductance motor can be attained in the same manner as the aforementioned linear stepping motor.

Figure 8:
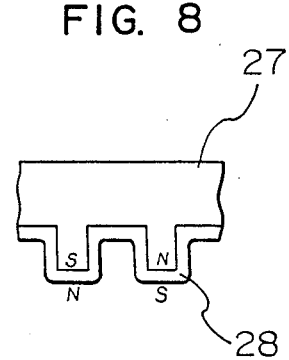
FIG. 8 is a partly enlarged view of the shape of a teeth portion showing a further embodiment according to the first aspect of the invention.

FIG. 8 is a sectional view showing the structure of teeth in a further embodiment. In this embodiment, a permanent magnet 28 is stuck to the teeth portion 27 of a movable member or a stator by means of evaporating deposition, sputtering or the like. In this embodiment, a fine teeth structure can be formed corresponding to the shape of the teeth portion 27 by means of evaporating deposition or sputtering. Accordingly, this embodiment has the effect in that the change of flux in accordance with the positional change of the movable member becomes very large to thereby increase the thrust constant.

Figure 9A:
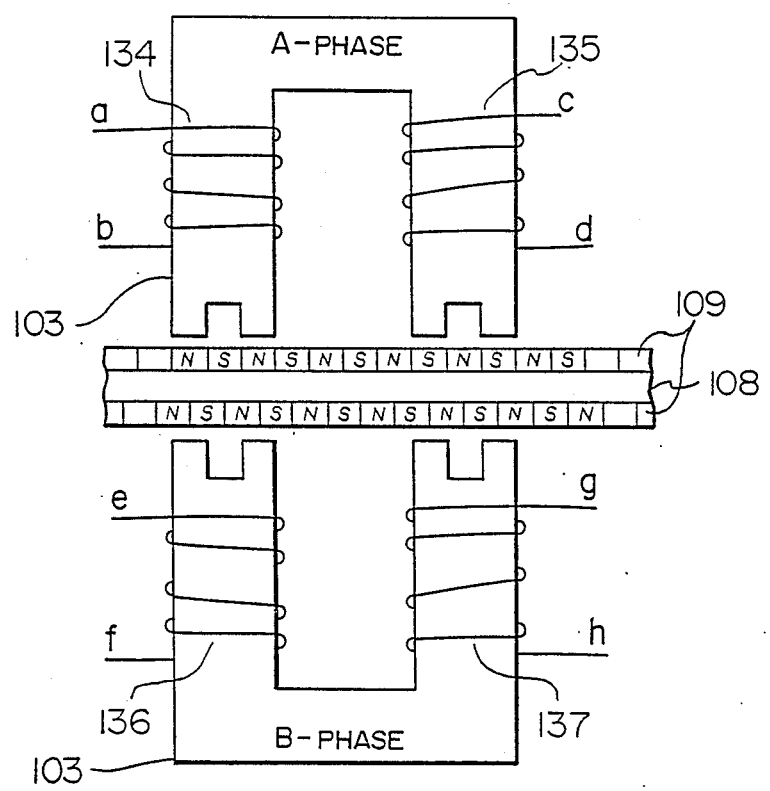
FIG. 9A is a sectional view of an actuator as an embodiment according to the second aspect of the invention.
Figure 9B:
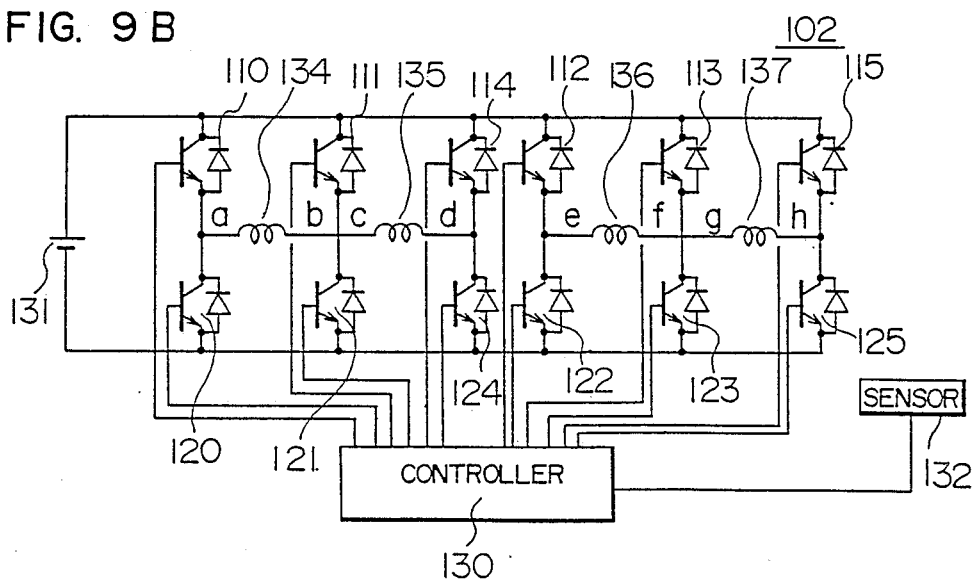
FIG. 9B is a circuit diagram of the actuator.
Figure 10A:
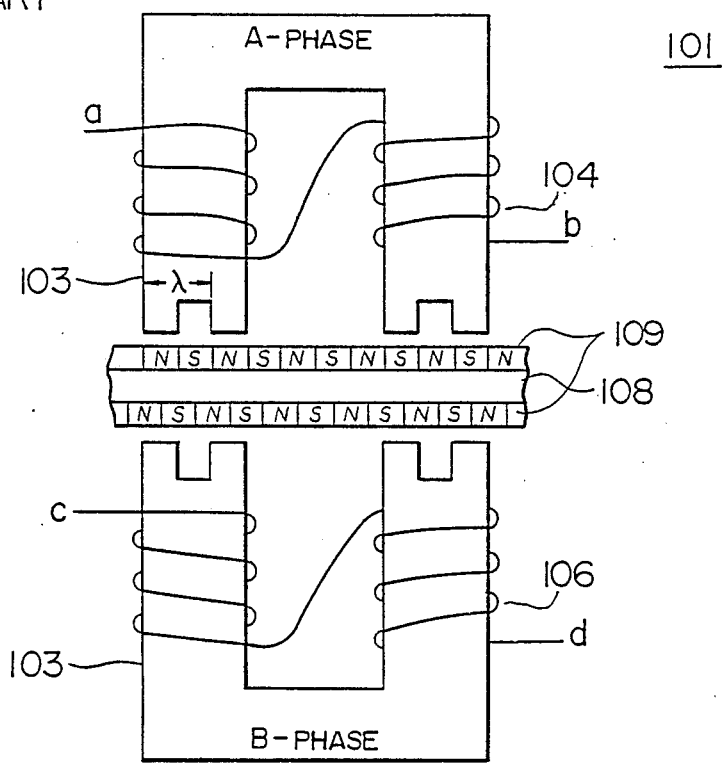
FIG. 10A is a sectional view of a second example of the conventional motor.
Figure 10B:
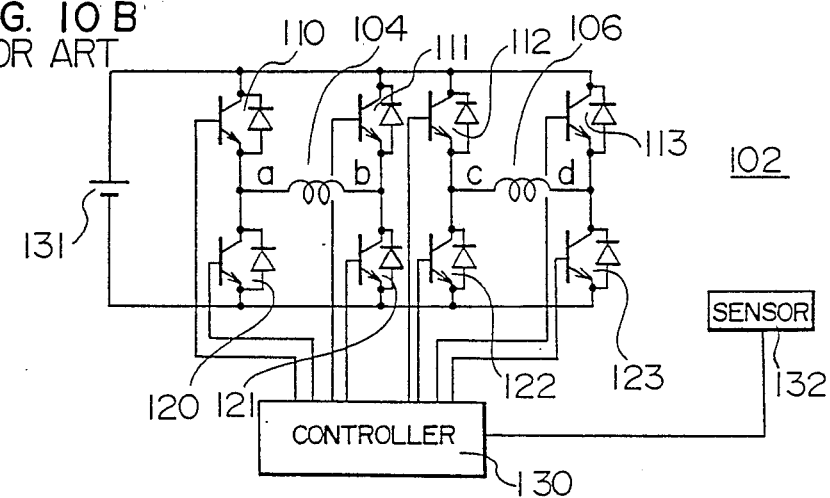
FIG. 10B is a circuit diagram of the second example of the conventional motor.
Figure 11:
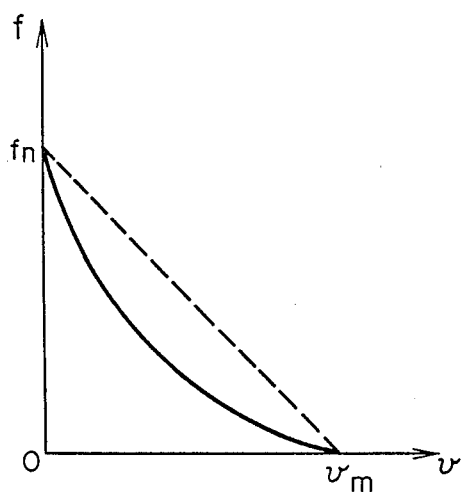
FIG. 11 is a velocity-thrust characteristic graph of the conventional motor.

In the following, the second aspect of the invention is described with reference to FIGS. 9A and 9B.

In the drawings, the reference numeral 101 designates a section of a motor, and the reference numeral 102 designates a motor drive circuit. The motor 101 has a pair of stators, and a movable member 108. The stators having teeth facing a movable member 108 are provided with A-phase windings 134 and 135 and B-phase windings 136 and 137, respectively. The movable member 108 is provided with permanent magnets 109 disposed at the opposite sides of the movable member 108 facing the stators. Each of the permanent magnets 109 has a plurality of poles disposed at equal intervals at the pitch equal to the pitch λ of the teeth of the stators. The magnetic position of one permanent magnet 109 on the A-phase side is shifted by an electric angle of 90 degrees ($\frac{1}{4}$ of λ) relative to that of the other permanent magnet 109 on the B-phase side.

In the drive circuit 102, transistors 110, 111, 120 and 121 are connected in the form of H through the A-phase winding 134. Transistors 111, 114, 121 and 124 are connected in the form of H through an A-phase winding 135. Transistors 112, 113, 122 and 123 are connected in the form of H through a B-phase winding 136. Transistors 113, 115, 123 and 125 are connected in the form of H through a B-phase winding 137. Signals from a control circuit 130 are applied to the bases of the respective transistors and a signal from a position sensor 132 is applied to the control circuit 130.

In the following, the method of driving the motor is described.

Let each of the A-phase windings 134 and 135 of the motor 101 has the number of turns which is half (N/2) the number of turns of the A-phase winding 105 of the conventional motor. Similarly, let each of the B-phase windings 136 and 137 has the number of turns which is half (N/2) the number of turns of the B-phase winding 106. In the condition in which the windings 134 and 135 and the windings 136 and 137 are respectively connected in series, the rating and thrust of the motor are equivalent to those of the conventional motor. Accordingly, the thrust constant $k_f$, the induced voltage constant $k_e$ and the inductance L are represented by the following equations (3):

$$\begin{cases} k_f = k_e = k_1 \cdot N \\ L = k_2 \cdot N^2 \end{cases} \quad (3)$$

$(k_1, k_2: \text{constant})$

In the case where the motor 1 operates at a low speed, the combination of transistors 110 and 124 and the combination of transistors 114 and 120 in the control circuit 102 are alternately turned on and off to pass a current through the windings 134 and 135 through the points a, b, c and d in order successively. On the B-phase side, the combination of transistors 112 and 125 and the combination of transistors 115 and 122 are similarly alternately turned on and off to pass a current through the windings 136 and 137 through the points e, f, g, and h in order successively. The direction of current flowing in the windings 134–137 is changed over corresponding to the inversion of flux interlinkage with the windings 134–137 in accordance with the position of the permanent magnets 109 while the position of the movable member 108 is detected by the position sensor 132, so that unidirectional thrust is generated to move the movable member 108.

When the speed of the movable member is accelerated and then the detected speed measured by the control circuit 130 on the basis of the position signal from the position sensor 132 reaches a certain value, the control circuit 130 changes the transistors to be repeatedly turned on and off. That is, on the A-phase side, the combination of the transistors 110 and 124 and the combination of the transistors 114 and 120 are respectively replaced by the combination of the transistors 111 and 124 and the combination of the transistors 114 and 121. On the B-phase side, the combination of the transistors 112 and 125 and the combination of the transistors 115 and 122 are respectively replaced by the combination of the transistors 113 and 125 and the combination of the transistors 115 and 123. Accordingly, on the A-phase side, a current can flow only in the winding 135, and on the B-phase side, a current can flow only in the winding 137. In this condition, the thrust constant $k_f'$, the induced voltage constant $k_e'$, the inductance $L'$ and the resistance $r'$ in the motor are represented by the following equations (4):

$$\begin{cases} k_f' = k_e' = k_1 \cdot \frac{N}{2} = \frac{k_f}{2} = \frac{k_e}{2} \\ L' = k_2 \left(\frac{N}{2}\right)^2 = \frac{k_2 N^2}{4} = \frac{L}{4} \\ r' = k_3 \frac{N}{2} = \frac{r}{2} \end{cases} \quad (4)$$

In the case where currents flow in the windings 134–137, the thrust at one phase is represented by the equation (2) as described above. In the case where currents flows only in the windings 135 and 137, the thrust f is represented by the following equation (5):

$$f = \frac{k_f'(E_s - k_e' \cdot V)}{\sqrt{r'^2 + \left(2\pi \frac{v}{p} L'\right)^2}} \quad (5)$$

$$\therefore f = \frac{k_f'\left(E_s - \frac{1}{2} k_e \cdot V\right)}{2\sqrt{\frac{r^2}{4} + \frac{1}{16}\left(2\pi \frac{v}{p} L\right)^2}}$$

In the case where currents flow in the windings 134-137, the starting thrust $f_m$ for $v=0$ is calculated from the equations (2) and (5):

$$f_m = \frac{k_f}{r} E_s \tag{6}$$

In the case where currents flows only in the windings 135 and 137, the starting thrust $f_{m'}$ is calculated in the same manner.

$$f_{m'} = \frac{k_f}{r} E_s \tag{7}$$

In the case where currents flow in the windings 134-137, the maximum velocity $V_m$ for $f=0$ is represented by the following equation (8):

$$V_m = E_s/k_e \tag{8}$$

In the case where currents flow only in the windings 135 and 137, the maximum velocity $V_{m'}$ is represented by the following equation (9):

$$V_{m'} = \frac{2E_s}{k_e} \tag{9}$$

Figure 12:
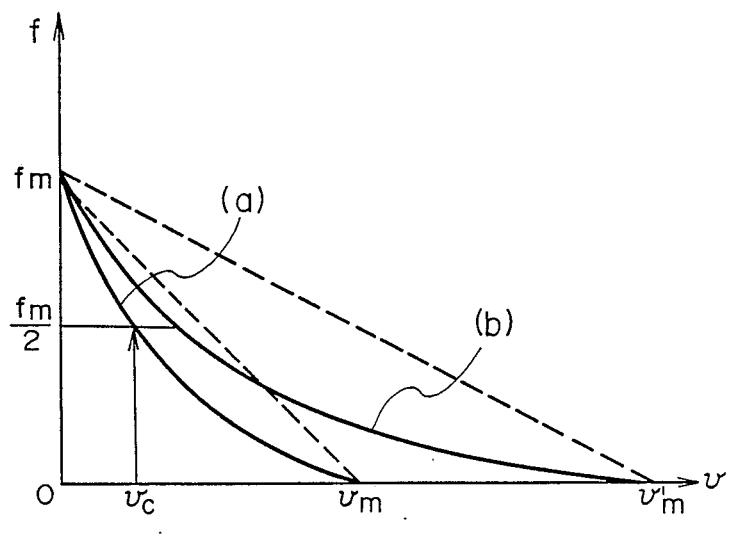
FIG. 12 is a velocity-thrust characteristic graph of the embodiment according to the second aspect of the invention.

FIG. 12 shows a velocity-thrust curve (a) in the case where currents flow in the windings 134-137, and a velocity-thrust curve (b) in the case where currents flow only in the windings 135 and 137. The resistance r' in the case of (b) is half the resistance in the case of (a). Accordingly, the current in the case of (b) is double the current in the case of (a). Accordingly, the current capacity of the windings and circuit is limited by the current capacity in the case of (a), so that the maximum thrust in the case of (b) becomes $f_m/2$ as shown by the dotted line in the drawing.

As described above, the magnitude of the thrust in the case where currents flow in the windings 134-137 and the magnitude of the thrust in the case where currents flow only in the windings 135 and 137 are reversed depending on the velocity. In other words, in the condition in which the velocity is lower than $V_c$, the thrust increases as the number of turns of the winding increases. However, in the condition in which the velocity is higher than $V_c$, the thrust increases as the number of turns decreases.

Accordingly, by control to pass currents through all the windings 134-137 in the condition in which the velocity is lower than $V_c$ and to pass currents only through the windings 135 and 137 in the condition in which the velocity is higher than $V_c$, the velocity-thrust characteristics can move on the characteristic curves (a) and (b) to attain large thrust and high speed.

Figure 13:
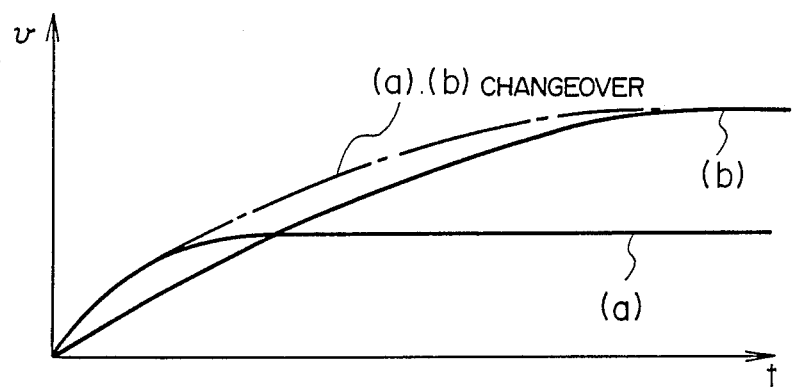
FIG. 13 is a velocity rising characteristic graph in the second aspect of the invention.

FIG. 13 shows the rising of velocity of the actuator according to the present invention. In the drawing, the curves (a) and (b) show the rising of velocity corresponding to the velocity-thrust characteristics (a) and (b), respectively. In the case (a) where currents flow in all the windings, the rising of velocity is rapid because of the large thrust, but the maximum velocity is low. In the case (b) where currents flow in half the windings, the rising of velocity is slow because of the small thrust, but the maximum velocity is high. Accordingly, by switching currents from all of the windings to half of the windings at Vc, the velocity rising characteristics in which velocity rises rapidly and reaches its maximum velocity rapidly can be attained as shown by the dotted-line curve of FIG. 13.

As described above, according to the second aspect of the invention, the winding for every phase in the motor is divided into two sections and controlled to pass currents through all the windings in the low-speed area and to pass currents through half of the windings in the high-speed area. Thus, an actuator or a motor having large thrust and being driven up to a high speed can be attained.

Although this embodiment has shown the case where the winding for every phase is divided into two sections, the invention is applicable to the case where the winding is divided into three or more sections to more improve the high-speed characteristics. However, in the case where the winding for every phase is divided into a large number of sections, some disadvantages arise in that: lead wires from the windings of the motor increase in number to make the treatment thereof troublesome; semiconductor elements such as transistors and the like increase; the control of such semiconductor elements becomes complex; and so on. Therefore, the division number of the winding must be determined on the consideration of the aforementioned advantages and disadvantages.

Although this embodiment has been applied to a linear actuator or motor, it is a matter of course that the invention is applicable to a rotary motor and that the same high-speed driving effect can be attained by providing the same means in the rotary motor.

In the following an embodiment according to the third aspect of the present invention is described.

Figure 16:
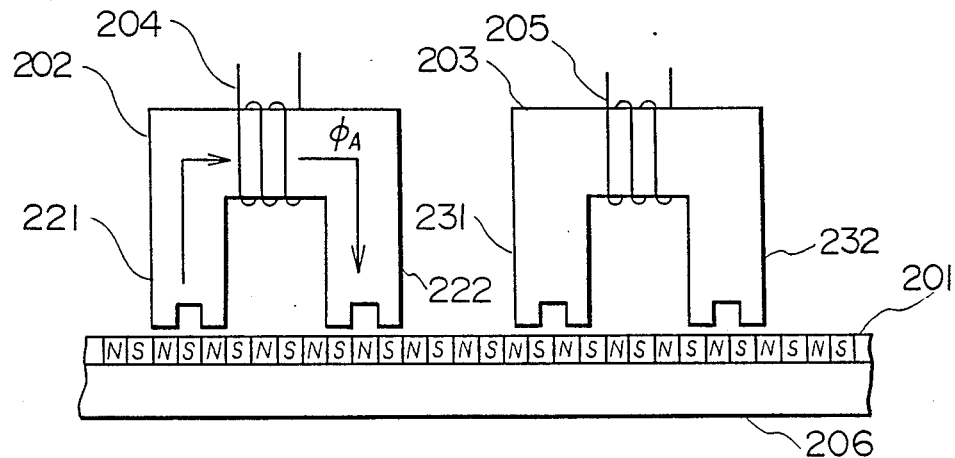
FIG. 16 is a principle view of a linear motor to which the third aspect of the invention is applied.

As described above, the present invention is applied to linear motors and linear stepping motors. Accordingly, the operational principle of linear motors is now described. In FIG. 16 the reference numeral 201 designates a permanent magnet, 202 designates an A-phase pole structure having a coil 204, and 203 designates a B-phase pole structure having a coil 205. The reference numeral 206 designates a movable member provided with the aforementioned permanent magnet 201 having a large number of N and S poles alternately arranged at equal intervals at a pitch equal to the pitch of the teeth of stators. The stator A-phase pole structure 202 has two poles 221 and 222. The relation of phase between the two poles 221 and 222 are such that, when the teeth projections of the pole 221 coincide with two N poles of the permanent magnet 201, the teeth projections of the pole 222 coincide with two S poles of the permanent magnet 201. Accordingly, as shown in the drawing, the flux $\phi_A$ is interlinked with the coil 204. On the other hand, the stator B-phase pole structure 203 has two poles 231 and 232 which have the same relation in phase as described above. Further, the relation in phase between the stator A-phase pole structure 202 and the stator B-phase pole structure 203 are such that, when the teeth projections of the stator A-phase pole structure 202 coincide with fine poles of the permanent magnet 201, the teeth projections of the stator B-phase pole structure 203 coincide with fine pole changeover points of the permanent magnet 201.

Figure 3:
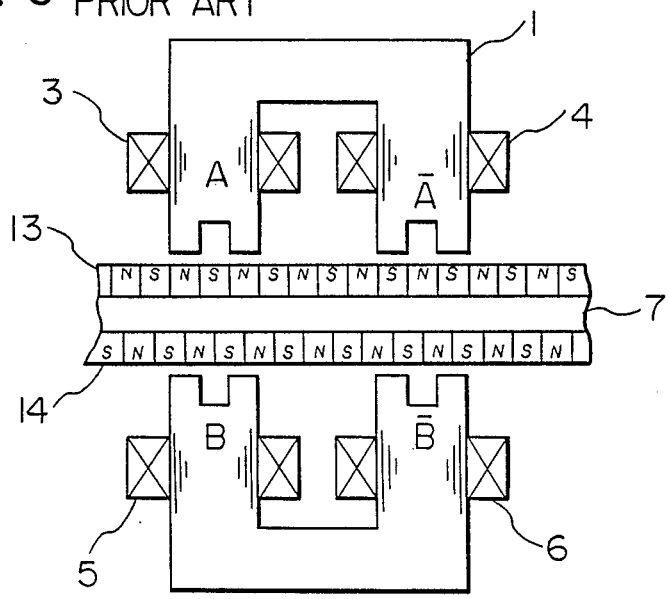

Accordingly, when the permanent magnet 201 is located in the position of FIG. 16, the flux $\phi_A$ is interlinked with the coil 204 but the flux $\phi_B$ is not interlinked with the coil 205. Further, when the polarity of the fine poles of the permanent magnet 201 facing the teeth projections of the poles 221 and 222 of the stator A- phase pole structure 202 is reversed with the movement of the movable member 206, the flux interlinked with the coil 204 is in the reversed direction to $\phi_A$. In the case where the positional relation between the stator A-phase pole structure 202 and the permanent magnet 201 is the same as the positional relation between the stator B-phase pole structure 203 and the permanent magnet 201 as shown in FIG. 3, flux is not interlinked with the coil 204. As described above, the flux interlinkage with the coil 204 changes in direction and magnitude corresponding to the position of the movable member 206. The flux interlinkage with the coil 205 changes corresponding the position of the movable member 206 in the same manner as described above, but the phase thereof is shifted by 90 degrees in terms of electrical angle.

Although this embodiment has shown the case in which the number of phases is two, the invention is applicable to the case where the number of phases is three or more. In the case of three or more phases, the phase difference between the phases is changed corresponding to the number of phases.

Although this embodiment has shown the case where the permanent magnet is provided on the movable member side, it is a matter of course that the effect of the invention does not substantially vary in the case where the permanent magnet is provided on the stator side.

The thrust of this motor is in proportion to the change of flux interlinkage with the coil in accordance with the positional change of the movable member. In order to attain large thrust in the linear stepping motor, the stepping pitch, that is, the teeth pitch of the inductor and the pole pitch of the permanent magnet must be minimized to enlarge the rate of change of the flux interlinkage with the coils of the inductor relative to the positional change of the movable member.

Accordingly, the minimization of the pole pitch of the permanent magnet is a technique essential to attain large thrust in the linear stepping motor.

Figure 15:
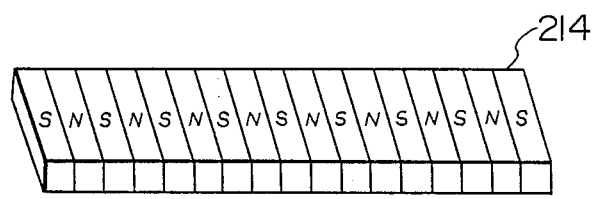
FIG. 15 is a perspective view of a conventional field magnet.

The conventional permanent magnet provided on the movable member is formed merely by magnetizing N and S poles alternately as shown in FIG. 15. If the pole pitch is minimized without modification of the conventional structure, a problem arises as follows.

Figure 17:
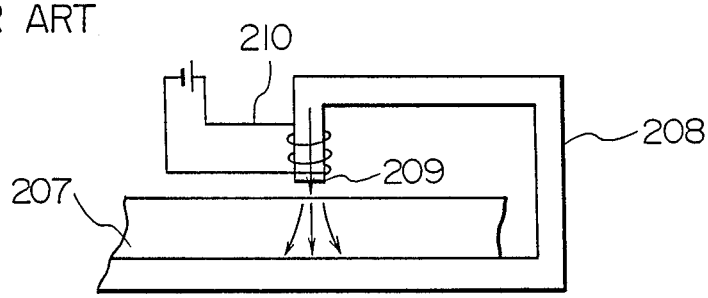
FIGS. 17 and 18 are views showing a method for magnetizing the conventional field magnet.
Figure 18:
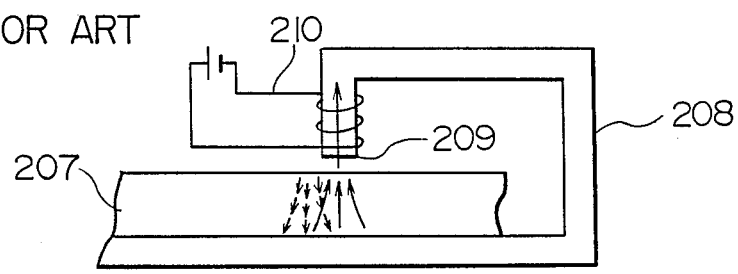

FIG. 17 shows the basic construction of a magnetization apparatus for forming the magnet of FIG. 15. In the magnetization apparatus, the area of a top end portion 209 of a core which faces a magnetic medium (permanent magnet) 207 is finely adjusted to a predetermined pitch, and then magnetization is carried out. Flux divergently passes through the permanent magnet in the directions of the arrows of FIG. 17, so that the magnetic force of the permanent magnet 207 is gradually weakened as the position of the permanent magnet 207 is far from the core. In order to arrange a large number of poles at equal intervals in a fine pitch, the direction of flux is alternately inverted while the core of the magnetization apparatus is successively moved pitch by pitch, as shown in FIG. 18. It is apparent from FIG. 18 that when the succeeding pole is magnetized, flux passes through the adjacent preceding pole which has been formed by magnetization to thereby greatly weaken the magnetic force of the preceding pole.

Accordingly, by the method in which a single plate of magnetic medium is magnetized in a fine pitch to form a permanent magnet having a large number of poles, cannot avoid lowering of magnetic force and satisfactory characteristics cannot be attained.

In order to solve this problem, there has been a method in which a permanent magnet is divided into fine rectangular parts at a pitch of pole, and those fine rectangular parts are stuck to each other as shown in FIG. 15 to form a single plate of permanent magnet having a large number of poles. According to the proposed method, sufficient electromotive force can be attained. However, variations often occur in pitch of the poles and height of the permanent magnet when a large number of fine rectangular parts are combined, because the accuracy low in producing the fine rectangular parts and in sticking thereof. Accordingly, in the case where the permanent magnet produced by the proposed method is applied to an actuator, satisfactory characteristics cannot be attained.

In short, according to the proposed method, a large number of poles having high magnetomotive force cannot be arranged with high accuracy at intervals of a fine pitch.

Figure 14:
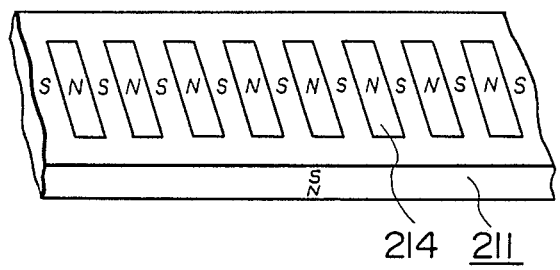
FIG. 14 is a perspective view of a field magnet showing an embodiment according to the third aspect of the invention.
Figure 19:
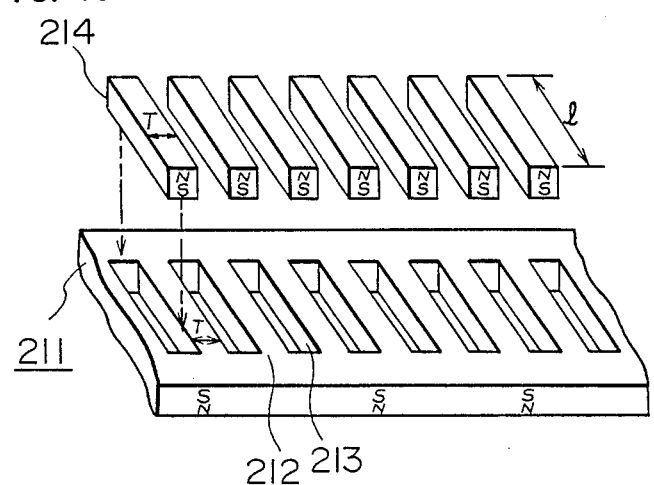
FIG. 19 is a development view showing the process of assembling the field magnet depicted in FIG. 14.

Contrariwise, the present invention provides a field magnet which has sufficient magnetomotive force even when poles are arranged at intervals at a fine pitch and which is superior in dimensional accuracy. FIG. 14 is a perspective view of a field magnet showing an embodiment according to the invention. FIG. 19 is a development view showing the process for the production of the field magnet. In FIG. 19, the reference numeral 211 designates a magnet substrate having a length and a width necessary as a field magnet used in a linear actuator. The whole upper surface of the magnet substrate 211 is magnetized as an N pole, and the whole lower surface thereof is magnetized as an S pole. In other words, the magnet substrate 211 is magnetized in the direction of thickness. The reference numeral 212 designates a grating having a plurality of grating parts each having a size of T in the moving direction. Magnet holding through holes 213 each having the same size T in the moving direction and a length l in the direction of width are formed between adjacent grating parts 213. The reference numeral 214 designates a plurality of magnetized permanent magnets. The permanent magnets 214 each having the same size T in the moving direction and the same length l in the direction of width are tightly inserted into the magnet holding through holes 213, respectively. Each permanent magnets 214 has an N pole provided at the upper portion and an S pole provided at the lower portion so that the polarity of the permanent magnet is reverse to that of the magnet substrate when the permanent magnets are inserted into the holding through holes one by one. The condition in which all the permanent magnets 214 are perfectly combined with the magnet substrate 211 is shown in FIG. 14. Thus, a field magnet having a large number of N and S poles alternately arranged at intervals of pitch T can be produced. The dimensional accuracy of the field magnet is determined by the accuracy in producing the magnet substrate 211. Accordingly, the dimensional accuracy can be improved because the magnet substrate 211 can be formed of a plastic magnet material. Further, the permanent magnets 214 can be formed of a plastic magnet material in the same manner.

If the permanent magnets 214 are disposed in the holding through holes 213 with a more or less offset, the errors due to the offset restricted within the range of the respective magnet holding through holes 213 and are not accumulated. Accordingly, very high pitch accuracy can be attained.

Because the permanent magnets 214 magnetized in the reverse direction to the magnetic substrate 211 are vertically combined to the magnetic substrate 211 to form poles, interfacial attraction force does not act in the beginning of insertion of the magnet substrate 214, so that the permanent magnets 214 can be smoothly inserted into the magnet holding through holes 213. Further, because attraction force acts between the permanent magnets 214 and the magnet substrate 211 after the permanent magnets have been inserted by half or more, so that the inserting work can be made easily. Further, because attraction force always acts between the permanent magnets 214 and the magnet substrate 211 after the insertion work has been finished, the permanent magnets 214 and the magnet substrate 211 are not departed from each other. In order to fix the permanent magnets 214 and the magnet substrate 211 more securely, an adhesive agent may be used therebetween.

The pitch T is within a range from 1 mm to several mm, and each magnet is very small as a unit. However, since the magnet is preliminarily magnetized, the magnetomotive force of the magnet is maintained at an original state as magnetized, so that large magnetic force can be attained. In an experiment, it has been found that the magnetomotive force of the field magnet shows a value two or three times as large as that of the conventional alternately magnetized magnet provided by alternately magnetizing one magnetic medium to form a large number of N and S poles arranged alternately. Further, the pitch T can be more minimized with the progress of accuracy in producing the magnet substrate 211 and permanent magnets 214 and with progress of mechanical accuracy in assembling. Accordingly, magnetomotive force can be maintained to thereby improve resolution power.

Figure 22:
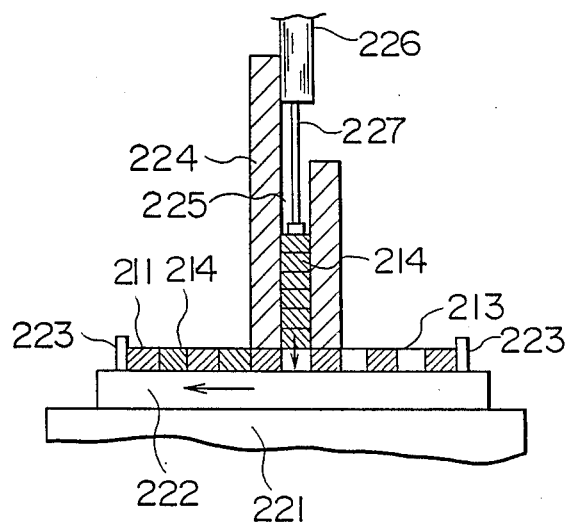
FIG. 22 is a sectional view showing an assembling machine for forming the field magnet depicted in FIGS. 14 and 21.

In the following, the schematic construction of an assembling machine for inserting the permanent magnets 214 into the magnetic substrate 211 is described with reference to FIG. 22.

In the drawing, the reference numeral 221 designates a floor or whole base. A slide bed 222 slidable in the direction of the arrow of FIG. 22 is carried on the floor or base 221. The slide bed 221 is actuated by an actuator (not shown) so that the slide bed can be moved at a pitch 2T in the direction of the arrow. The reference numeral 211 designates a magnet substrate fixed on the slide bed 222 by a pair of clamps 223. The reference numeral 224 designates a holder fixed to the base 221 and vertically provided on the magnet substrate 211. The reference numeral 225 designates a guide hole vertically formed in the holder 224. A large number of permanent magnets 214 are inserted into the guide hole 225 and held by the holder 225. The lower end of the guide hole 225 coincides with one of holding through holes 213 of the magnet substrate 211. The reference numeral 226 designates a cylinder disposed in the upper end of the holder 224 and provided with a rod 227 for giving a predetermined amount of downward force to the permanent magnets 214 within the guide hole 225 of the holder 224. In the case where the holder 224 is made of a magnetic material, such as iron and the like, the force must be more than the attraction force of the permanent magnets to the holder 224. In the case where the holder 224 is made of a non-magnetic material, such as aluminum, synthetic resin and the like, the force of the cylinder 226 may be slight because such attraction force is not generated.

While the magnet substrate 211 is carried on the slide bed 222, one of the permanent magnets 214 located in the lowermost position within the guide hole 225 is pressed into a first one of the holding through holes 213. Next, the slide bed 222 is moved in the direction of the arrow by the pitch 2T, so that a next one of the holding through holes 213 is located in the lower end of the guide hole 225. When the cylinder is operated in this condition, a next one of the permanent magnets 214 drops into the holding through hole 213. As described above, the permanent magnets can be inserted into the holding through holes, successively. In the inserting process, because the polarity of the permanent magnet is the same as that of the magnet substrate at the time of start of insertion, the two magnets repulse each other so that the permanent magnet can be smoothly inserted in the middle without attraction. Although the polarity is equalized after that, the permanent magnet is not moved easily because the permanent magnet has been inserted by half or more. Further, the permanent magnet can be securely inserted by the force from the cylinder 226.

Although this embodiment has shown the case where the permanent magnets 224 are inserted one by one into the holding through holes 213 of the magnetic substrate 211, it is understood that the invention is not limited thereto and that the holding through holes provided in the magnet substrate 211 may be replaced by any other magnet holding portions such as grooves or the like so long as the magnet holding portions can hold the permanent magnets. Further, the shape and depth of the magnet holding portions may be modified suitably.

Figure 21:
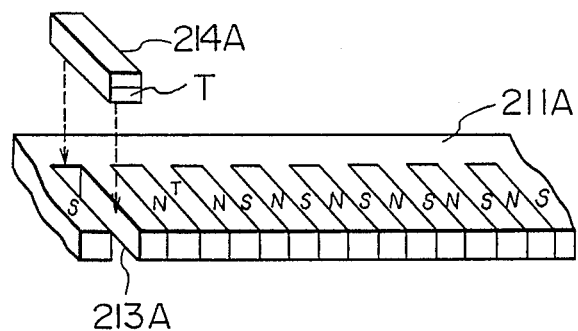

FIG. 21 shows another embodiment which is constructed substantially in the same manner as described above, except that the magnet holding through holes are replaced by magnet holding slots 213A to form a comb-like magnet substrate 211A as the whole. In this embodiment, one side of the magnet substrate shown in FIG. 19 can be omitted, so that the field magnet can be reduced more in size. It is a matter of course that permanent magnets 214A can be combined with the comb-like magnet substrate 211A by use of the insertion machine of FIG. 22.

The aforementioned embodiments, however, have a problem in that the time required for insertion is large because the permanent magnets are provided as separate units and must be inserted one by one into the holding through holes 213 or slots 213A.

Figure 20:
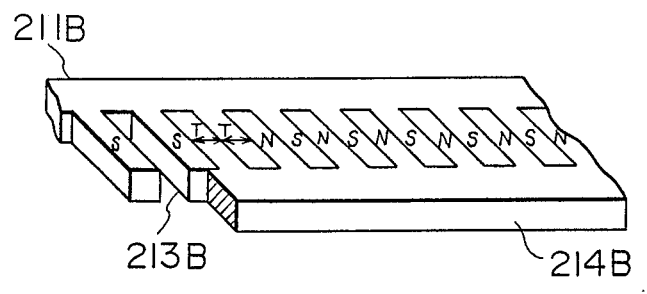
FIGS. 20 and 21 are perspective views showing other embodiments according to the third aspect of the invention.

Means for solving the problem is shown in FIG. 20. In FIG. 20, both a magnet substrate 211B and a permanent magnet 214b are shaped like a comb having holding slots 213B with pitch T so that the two members 211B and 214B can be combined with each other. The insertion may be made horizontally or may be made vertically. The latter case is preferable because repulsive force acts at first and attractive force acts at last.

This embodiment of FIG. 20 has an advantage in that the combination is perfected by one inserting operation. The arrangement of polarity in FIG. 20 is the same as described above. The same magnetomotive force as in FIG. 19 can be attained.

In the case where the size required for a field magnetic is large, some unit combs may be arranged in line and fixed to a substrate not shown to thereby attain necessary length.

Although the field magnet is used as a constituent component of a movable member in the embodiment, it is a matter of course that it may be used as a constituent component of a stator.

As described above, according to the first aspect of the invention, the inductance of the stepping motor can be reduced without the lowering of the thrust constant, so that the linear stepping motor can be driven with large thrust and at a high speed when the motor is driven with constant source voltage capacity.

Further, according to the second aspect of the invention, the winding for each phase in the motor is divided into two or more sections and controlled to increase the number turns of the winding through which a current is made to flow to enlarge the thrust constant to thereby generate large thrust in the low-speed condition and to decrease the number of turns of the winding through which a current is made to flow to reduce the induced voltage constant and inductance to thereby prevent the lowering of current to maintain the thrust of the motor in the high-speed condition. Consequently, the motor can be operated at a high speed.

Further, according to the third aspect of the invention, a field magnet comprises a magnet substrate having through holes or slots disposed at equal intervals of a predetermined pitch and magnetized in the direction of thickness, and permanent magnets each magnetized in the reverse direction to the magnet substrate and inserted into the through holes or slots of the magnet substrate to form the field magnet in combination. Accordingly, the problem in demagnetizing action due to magnetization can be eliminated. Accordingly, the magnetomotive force can be improved more, and the pitch can be minimized suitably. In addition, dimensional accuracy can be improved.

We claim:

1. A field magnet comprising:
   a permanent magnet substrate having a plurality of through holes or slots formed to penetrate the substrate in a first direction of its thickness and disposed at a predetermined pitch along a predetermined second direction on one surface of the substrate, said magnet substrate being magnetized at one polarity in said first direction; and
   permanent magnets inserted in said through holes or slots and magnetized in said first direction and at a polarity opposite to the polarity of magnetization of said magnet substrate so that elements of said magnet substrate between every adjacent two of said through holes and said permanent magnets provide magnet poles of said one and opposite polarities disposed alternately.

2. A field magnet according to claim 1, in which said permanent magnets are separated from each other.

3. A field magnet according to claim 1, in which said permanent magnets are formed as a unitary element so that said permanent magnets are connected integrally to each other at respective ends thereof like a comb.

4. A field magnet according to claim 1, in which each of said permanent magnets has a thickness equal to that of said magnet substrate.

5. A field magnet according to claim 1, in which each of said magnet substrate and said permanent magnets is formed of a plastic magnet.

6. A field magnet according to claim 1, in which said field magnet is for use in a rotary or linear stepping motor.

7. A field magnet according to claim 2, in which said field magnet is for use in a rotary or linear stepping motor.

8. A field magnet according to claim 3, in which said field magnet is for use in a rotary or linear stepping motor.

9. A field magnet according to claim 4, in which said field magnet is for use in a rotary or linear stepping motor.

10. A field magnet according to claim 5, in which said field magnet is for use in a rotary or linear stepping motor.

* * * * *